US012231456B2

(12) United States Patent
Zawadowskiy et al.

(10) Patent No.: US 12,231,456 B2
(45) Date of Patent: Feb. 18, 2025

(54) SYSTEM AND METHOD USING A LARGE LANGUAGE MODEL (LLM) AND/OR REGULAR EXPRESSIONS FOR FEATURE EXTRACTIONS FROM UNSTRUCTURED OR SEMI-STRUCTURED DATA TO GENERATE ONTOLOGICAL GRAPH

(71) Applicant: Cisco Technology, Inc., San Jose, CA (US)

(72) Inventors: Andrew Zawadowskiy, Hollis, NH (US); Oleg Bessonov, San Jose, CA (US); Vincent Parla, North Hampton, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/361,405

(22) Filed: Jul. 28, 2023

(65) Prior Publication Data
US 2024/0330365 A1   Oct. 3, 2024

Related U.S. Application Data

(60) Provisional application No. 63/493,552, filed on Mar. 31, 2023.

(51) Int. Cl.
*G06F 21/31*   (2013.01)
*G06F 11/34*   (2006.01)
(Continued)

(52) U.S. Cl.
CPC ...... *H04L 63/1433* (2013.01); *G06F 11/3476* (2013.01); *G06F 16/334* (2019.01);
(Continued)

(58) Field of Classification Search
CPC .......................... G06F 11/3476; G06F 16/9024
See application file for complete search history.

(56) References Cited

U.S. PATENT DOCUMENTS

| 8,479,291 B1 | 7/2013 | Bodke |
| 11,113,175 B1 * | 9/2021 | Adamo ................. G06F 40/216 |

(Continued)

FOREIGN PATENT DOCUMENTS

WO   2022188066 A1   9/2022

OTHER PUBLICATIONS

Ainslie S., et al., "Cyber-threat Intelligence for Security Decision-making: A Review and Research Agenda for Practice," Science Direct, Computers & Security, vol. 132, Sep. 2023, pp. 1-16.
(Continued)

*Primary Examiner* — Tarek Chbouki
(74) *Attorney, Agent, or Firm* — Polsinelli P.C.

(57) ABSTRACT

A system and method are provided for generating a cyber-security behavioral graph from a log files and/or other telemetry data, which can be unstructured or semi-structured data. The log files are applied to a machine learning (ML) model (e.g., a large language model (LLM)) that generates/extract from the log files entities and relationships between said entities. The entities and relationships can be constrained using a cybersecurity ontology or schema to ensure that the results are meaningful to a cybersecurity context. A graph is then generated by mapping the extracted entities to nodes in the graph and the relationships to edges connecting nodes. To more efficiently extract the entities and relationships from the data file, an LLM is used to generate regular expressions for the format of the log files. Once generated, the regular expressions can rapidly parse the log files to extract the entities and relationships.

17 Claims, 11 Drawing Sheets

(51) Int. Cl.
*G06F 16/334* (2025.01)
*G06F 16/34* (2019.01)
*G06F 16/901* (2019.01)
*G06F 21/55* (2013.01)
*G06F 21/56* (2013.01)
*G06F 21/57* (2013.01)
*H04L 9/40* (2022.01)

(52) U.S. Cl.
CPC ........ *G06F 16/345* (2019.01); *G06F 16/9024* (2019.01); *G06F 21/31* (2013.01); *G06F 21/552* (2013.01); *G06F 21/563* (2013.01); *G06F 21/577* (2013.01); *H04L 63/1425* (2013.01); *H04L 63/145* (2013.01); *H04L 63/1483* (2013.01); *H04L 63/1491* (2013.01)

(56) References Cited

U.S. PATENT DOCUMENTS

| | | | |
|---|---|---|---|
| 2009/0119095 A1* | 5/2009 | Beggelman | G06F 40/30 704/9 |
| 2015/0378984 A1 | 12/2015 | Ateya et al. | |
| 2016/0246844 A1* | 8/2016 | Turner | G06F 16/2455 |
| 2016/0247087 A1 | 8/2016 | Nassar et al. | |
| 2017/0075904 A1 | 3/2017 | Hedges | |
| 2017/0193229 A1 | 7/2017 | Roychowdhury et al. | |
| 2018/0205755 A1 | 7/2018 | Kavi et al. | |
| 2018/0329958 A1 | 11/2018 | Choudhury et al. | |
| 2019/0138628 A1* | 5/2019 | Walker | G06F 40/295 |
| 2019/0163736 A1* | 5/2019 | Sharma | G06F 16/951 |
| 2019/0303498 A1 | 10/2019 | Saha et al. | |
| 2020/0125746 A1* | 4/2020 | Joshi | G06F 21/6245 |
| 2020/0293656 A1 | 9/2020 | Lakhotia | |
| 2020/0356675 A1 | 11/2020 | Shakarian et al. | |
| 2020/0356900 A1* | 11/2020 | Briancon | G06N 20/20 |
| 2021/0144154 A1 | 5/2021 | Levy | |
| 2021/0294829 A1 | 9/2021 | Bender et al. | |
| 2021/0312058 A1 | 10/2021 | Chiarelli et al. | |
| 2021/0342380 A1 | 11/2021 | Luus et al. | |
| 2022/0004630 A1 | 1/2022 | Almukaynizi et al. | |
| 2022/0121964 A1 | 4/2022 | Ramakrishnan et al. | |
| 2022/0138241 A1 | 5/2022 | Chen et al. | |
| 2022/0156380 A1 | 5/2022 | Pradzynski et al. | |
| 2022/0179866 A1* | 6/2022 | Chan | G06F 16/24553 |
| 2022/0207152 A1 | 6/2022 | Bellis et al. | |
| 2022/0237409 A1* | 7/2022 | Zhang | G06F 18/231 |
| 2022/0309335 A1* | 9/2022 | Varghese | G06N 3/08 |
| 2023/0004559 A1 | 1/2023 | Kreutzer et al. | |
| 2023/0019941 A1 | 1/2023 | Doyle et al. | |
| 2023/0036159 A1 | 2/2023 | Duppils et al. | |
| 2023/0086327 A1 | 3/2023 | Song et al. | |
| 2023/0412635 A1* | 12/2023 | Binyamini | G06N 5/022 |
| 2024/0193157 A1* | 6/2024 | Hasan | G06F 16/2228 |

OTHER PUBLICATIONS

Alrzini J., et al., A Review of Polymorphic Malware Detection Techniques, International Journal of Advanced Research in Engineering and Technology (IJARET), vol. 11, No. 12, Dec. 2020, pp. 1238-1247.

Rao D., "How to Use Large Language Models and Knowledge Graphs to Manage Enterprise Data", Venturebeat, Apr. 15, 2023, pp. 1-17.

* cited by examiner

| Character | Meaning |
|---|---|
| * | Match zero, one or more of the previous |
| ? | Match zero or one of the previous |
| + | Match one or more of the previous |
| \ | Used to escape a special character |
| . | Wildcard character, matches any character |
| ( ) | Group characters |
| [ ] | Matches a range of characters |
| \| | Matche previous OR next character/group |
| { } | Matches a specified number of occurrences of the previous |
| ^ | Beginning of a string. Or within a character range [ ] negation. |
| $ | End of a string. |

FIG. 3

SYSTEM AND METHOD USING A LARGE LANGUAGE MODEL (LLM) AND/OR REGULAR EXPRESSIONS FOR FEATURE EXTRACTIONS FROM UNSTRUCTURED OR SEMI-STRUCTURED DATA TO GENERATE ONTOLOGICAL GRAPH

CROSS-REFERENCE TO RELATED APPLICATIONS

This application claims the benefit of priority to U.S. Provisional Patent Application No. 63/493,552, filed Mar. 31, 2023, the disclosure of which is herein incorporated by reference in its entirety

BACKGROUND

In computing, logging is the act of keeping a log of events that occur in a computer system, such as problems, errors, and information on current operations. These events may occur in the operating system or in other software. A message or log entry is recorded for each such event. These log messages can then be used to monitor and understand the operation of the system and to debug problems.

Log management is an approach to dealing with large volumes of computer-generated log messages. Drivers for log management implementations include security, system and network operations (such as system or network administration) and regulatory compliance. Logs are generated by nearly every computing device, and can often be directed to different locations both on a local file system or remote system.

In cybersecurity, log files can be used to detect and analyze security incidents. Other types of telemetry data can also be used to detect and analyze security incidents. Directly reviewing log files and other telemetry can be tedious and difficult to decipher. Accordingly, distilling and repackaging the relevant information from the log files and other telemetry data into a more meaningful format can be beneficial. Further, there are many formats for various log files and other telemetry data. Thus, it is also beneficial to provide a unified format for capturing and conveying the information that is relevant to cybersecurity.

Graphs are sometimes used in cybersecurity to model behavioral patterns or attack incidents for detection and analysis, and graphs are widely used to determine cybersecurity solutions. However, building the graphs is a difficult process and fraught with inconsistencies resulting from inconsistencies in logs from different vendors and systems.

Accordingly, improved systems and methods are desired to more quickly and consistently generate graphs from log files and other telemetry data, where the graphs model cybersecurity behavior captured by the log files and other telemetry data.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates an aspect of the subject matter in accordance with one embodiment.

DESCRIPTION OF EXAMPLE EMBODIMENTS

Figure 1A:
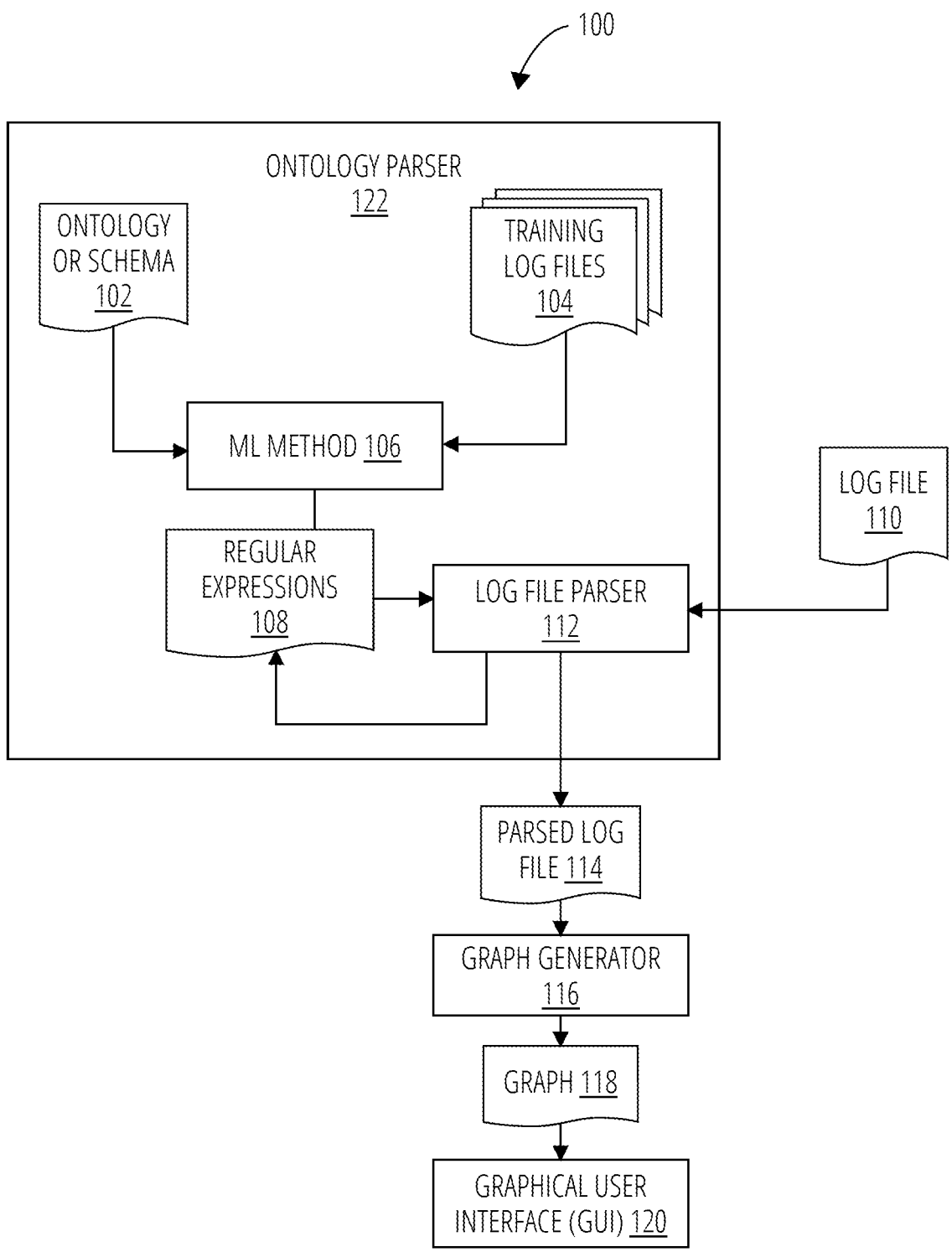
FIG. 1A illustrates a block diagram for an example of a system/device for generating graphs from log files, in accordance with certain embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In one aspect, a method is provided for generating a graph from a data file comprising unstructured or semi-structured data. The method further includes applying a data file to a machine learning (ML) method and generating from the data file entities and relations between said entities, wherein the entities and the relations are constrained by a predefined ontology; and generating a graph using the entities and relations that are generated from the data file.

In another aspect, the method may also include applying the data file to the ML method to generate regular expressions, wherein the regular expressions comprise patterns for how the entities and the relations are expressed in the data file, and the regular expressions are constrained by the predefined ontology or predefined schema; parsing the data file using the regular expressions to generate parsed data representing a semantic content of the data file; and generating the graph from the parsed data, wherein the graph provides a visualization of cybersecurity behavior conveyed by the data file.

In another aspect, the graph provides a visualization of cybersecurity behavior conveyed by the data file, and/or the graph provides a topological representation of the behavior conveyed by the data file, and an isomorphism between the topological representation and a topology of an other graph is used to determine a similarity of the behavior conveyed by the data file to a behavior conveyed by the other graph.

In another aspect, the method may also include generating other entities and other relations by parsing another data file using the regular expressions generated from the data file; and generating another graph from the parsed another data, wherein the another graph is another ontological graph representing the another data file.

In another aspect, the method may also include monitoring the parsing of the another data file to determine whether the regular expressions generated from the data file are effective for parsing the another data file; and when the regular expressions generated from the data file are determined to not be effective for parsing the another data file, updating the regular expressions by applying the another data file or a third data file to the ML method to generate updated regular expression, wherein the updated regular expressions comprise additional entities and additional relations that are constrained by categories of the predefined ontology or the predefined schema.

In another aspect, monitoring the parsing of the another data file may include determining, using the another data file, one or more criteria that indicate whether the regular expressions are effective for parsing the another data file; and determining that the regular expressions generated are not effective for parsing the another data file when the one or more criteria are satisfied.

In another aspect, monitoring the parsing of the another data file includes determining a score representing an amount of content of a portion of the another data file that is mapped to the regular expressions relative a total amount of the content of the portion of the another data file; comparing the score to a predefined threshold; and determining that the regular expressions generated from the data file is not effective for parsing the another data file when the score is less than the predefined threshold.

In another aspect, the method may also include calculating a score based on comparing statistics of the other entities and/or the other relations to baseline statistics for the entities and/or the relations; comparing the score to a predefined threshold; and determining that the one or more criteria are met when the score exceeds the predefined threshold thereby indicating that the regular expressions are not effective for parsing the another data file.

In another aspect, the method may also include that the data file comprises a log file that has a file format selected from the group consisting of Common Log Format (CLF); a JavaScript Object Notation (JSON) format; a Windows Event logs format; a Common Event Format (CEF); Extended Log Format (ELF); a W3C Extended Log File format; an Event Log format; a Server Log format; a System Log (syslog) format; an Authorization Log format; a Access Log format; a Change Log format; an Availability Log format; a Resource Log format; a Threat Logs: format; an Endpoint Security Log format.

In another aspect, the method may also include displaying the graph in a graphical user interface (GUI).

In another aspect, the method may also include that the ML method is a large language model (LLM), and generating the regular expressions includes providing the data file to the LLM together with an instruction to generate the regular expressions from the data file.

In another aspect, the method may also include evolving the regular expressions based on an error function to minimize the error function, wherein the error function represents an effectiveness of the regular expressions for parsing the data file and parsing another data file.

In another aspect, the method may also include applying another data file to the ML method to generate another regular expressions, wherein the another regular expressions comprise another entities and another relations that are constrained by the predefined ontology, and the data file is a first type of log file and the another data file is a second type of log file; using the regular expressions when parsing logs filed of the first type; and using the another regular expressions when parsing logs filed of the second type.

In one aspect, a computing apparatus includes a processor. The computing apparatus also includes a memory storing instructions that, when executed by the processor, configure the apparatus to perform the respective steps of any one of the aspects of the above recited methods.

In one aspect, a computing apparatus includes a processor. The computing apparatus also includes a memory storing instructions that, when executed by the processor, configure the apparatus to apply the data file to the ML method to generate regular expressions, wherein the regular expressions comprise patterns for how the entities and the relations are expressed in the data file, and the regular expressions are constrained by the predefined ontology or the predefined schema; parse the data file using the regular expressions to generate parsed data representing a semantic content of the data file, the parsed data comprising the entities and the relations; and generate the graph from the parsed data.

In another aspect, when executed by the processor, instructions stored in the memory cause the processor to apply the data file to the ML method to generate regular expressions, wherein the regular expressions comprise patterns for how the entities and the relations are expressed in the data file, and the regular expressions are constrained by the predefined ontology or schema; parse the data file using the regular expressions to generate parsed data representing a semantic content of the data file; and generate the graph from the parsed data, wherein the graph provides a visualization of cybersecurity behavior conveyed by the data file.

In another aspect, when executed by the processor, instructions stored in the memory cause the processor to generate other entities and other relations by parsing another data file using the regular expressions generated from the data file; and generate another graph from the parsed another data, wherein the another graph is another ontological graph representing the another data file.

In another aspect, when executed by the processor, instructions stored in the memory cause the processor to monitor the parsing of the another data file to determine whether the regular expressions generated from the data file are effective for parsing the another data file; and when the regular expressions generated from the data file are determined to not be effective for parsing the another data file, update the regular expressions by applying the another data file or a third data file to the ML method to generate updated regular expression, wherein the updated regular expressions comprise additional entities and additional relations that are constrained by categories of the predefined ontology or the predefined schema.

In another aspect, when executed by the processor, instructions stored in the memory cause the processor to monitor the parsing of the another data file by: determining, using the another data file, one or more criteria that indicate whether the regular expressions are effective for parsing the another data file; and determining that the regular expressions generated are not effective for parsing the another data file when the one or more criteria are satisfied.

In another aspect, the data file comprises a log file that has a file format selected from the group consisting of Common Log Format (CLF); a JavaScript Object Notation (JSON) format; a Windows Event logs format; a Common Event Format (CEF); Extended Log Format (ELF); a W3C Extended Log File format; an Event Log format; a Server Log format; a System Log (syslog) format; an Authorization Log format; a Access Log format; a Change Log format; an Availability Log format; a Resource Log format; a Threat Logs: format; an Endpoint Security Log format.

In another aspect, the ML method is a large language model, and generating the regular expressions includes providing the data file to the LLM together with an instruction to generate the regular expressions from the data file.

In another aspect, when executed by the processor, instructions stored in the memory cause the processor to evolve the regular expressions based on an error function to minimize the error function, wherein the error function represents an effectiveness of the regular expressions for parsing the data file and parsing another data file.

In another aspect, when executed by the processor, instructions stored in the memory cause the processor to apply another data file to the ML method to generate another regular expressions, wherein the another regular expressions comprise another entities and another relations that are constrained by the predefined ontology or schema, and the data file is a first type of log file and the another data file is a second type of log file; use the regular expressions when parsing logs filed of the first type; and use the another regular expressions when parsing logs filed of the second type.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for generating cybersecurity graphs from log files and other telemetry data (e.g., unstructured and semi-structured data). Graphs can be used in cybersecurity to model behavioral patterns or attack incidents for detection and analysis. Further, graphs are widely used to determine cybersecurity solutions. However, building the graphs can be a difficult process that can be fraught with inconsistencies.

As a precursor to generating graphs, the log files can be parsed to determine entities and relationships between those entities that are expressed in the log files. These entities and relationships can then be used to generate graphs. For example, based on the programmer's insights regarding how various entities and relations between entities are commonly expressed within the given format of the log files, a programmer can hand code a program for parsing the log files into respective entities and relationships between those entities. This coding by hand can, however, be time-consuming. Further, inconsistencies can arise due to the fact that the format of log files can differ between different vendors. Additionally, the format of log files can evolve and change over time, resulting in considerable time and effort to update the programs used for parsing the log files. Due to the multiplicity of formats of log files and the changes in these formats over time, significant time and resources can be devoted to developing parsing programs, and, even with this significant time and resources, the results may nevertheless be fraught with inconsistencies.

The systems and methods disclosed herein harness the capabilities of large language models (LLMs) to more quickly and consistently generate graphs based on log files.

Processing and analyzing "log files" (abbreviated as "logs") can present several challenges. The log files used to generate a graph modeling behavioral patterns for cybersecurity are often collected at different observation points. For example, the log files can provide observations of behaviors of the processes, file access, network access, registry, and more. Additionally, the logs can be a large and unstructured part of security telemetry. Logs from different vendors and systems present can vary in format, thereby presenting a complex parsing problem. Further, the problem is complicated by the large number of different vendors who have their own formats and by the fact that over time these formats can continuously evolve.

These challenges can be addressed, at least in part, by using a large language model (LLM) that is constrained by a framework, such as a cybersecurity ontology or schema, to more efficiently and consistently generate graphs that represent the behaviors expressed in log files. In various implementations of the methods and systems disclosed herein, the LLM can be variously used to map terms and phrases in the log files to entities and relationships between the entities. In certain non-limiting examples, the LLM is used to generate regular expressions that correspond to entities and relationships. Then the regular expressions are used to parse the log files to the entities and relationships, and the parsed entities and relationships are used to generate graphs. In other non-limiting examples, the LLM is used as part of the process to extract/generate the entities and relationships from the log files, and then the entities are used to generate graphs.

In both of the above sets of non-limiting examples, the LLM can be constrained using a framework (e.g., a cybersecurity ontology or schema) to ensure consistency between the categories/types of entities and relationships that are used to generate graphs from the log files. Generally, frameworks provide a system for guiding the expressions of concepts and relationships between concepts. Ontologies or schemas are common examples of frameworks. The cybersecurity ontology or schema expresses concepts and relationships that have common, unambiguous, and unique definitions that are agreed on in the shared range of a particular domain (e.g., cybersecurity). Thus, when using the cybersecurity ontology to constrain the LLM, the LLM maps the terms and phrases in the log files to categories/types within the range defined by the cybersecurity ontology to extract the relevant information for cybersecurity behavior. Thus, even though different formats are used for log files from disparate sources, the cybersecurity ontology can ensure consistency between the categories of entities and relationships to which the log files are mapped.

The entities are then mapped to nodes of the graph and the relationships are expressed as directed (or undirected) edges between nodes in the graph. For example, undirected edges are used between nodes in the graph when the relationship is commutative (e.g., changing the order of the phrase from "node A is related to node B" to "node B is related to node A" does not change the relation), but directed edges are used between nodes in the graph when the relationship is not commutative/directional (e.g., node A causes node B). Thus, this consistency between the categories of entities and relationships to which the log files are mapped also improves the consistency between graphs generated from different log files, even when the different log files are expressed using different file formats.

A schema can provide a common/unified framework that enables combining log files and telemetry having disparate formats into a unified behavioral cybersecurity graph. More particularly, to generate a graph representing the behavior expressed across multiple log files, the log files are processed and analyzed based on schema to extract key concepts and relations between the key concepts.

Consider for example the Open Cybersecurity Schema Framework (OCSF), which is made up of a set of data types and objects, an attribute dictionary, and the taxonomy. Although not restricted to the cybersecurity domain nor to events, the OCSF was initial focused on a schema for cybersecurity events. The OCSF is agnostic to storage format, data collection and Extract, Transform, Load (ETL) processes. The core schema is generally agnostic to implementations, and the schema framework definition files and the resulting normative schema are written as JSON, as described in P. Agbabian "Understanding the Open Cybersecurity Schema Framework," Version: 1.12, available at https://github.com/ocsf/ocsf-docs/blob/main/Understanding %20OCSF.pdf, which is incorporated herein in its entirety.

Resource description framework (RDF) schema is another example of a schema that can be used with the systems and methods disclosed herein. The RDF schema is a set of classes with certain properties using the RDF extensible knowledge representation data model, providing basic elements for the description of ontologies. It uses various forms of RDF vocabularies, intended to structure RDF resources.

A cybersecurity ontology can provide a common/unified framework that enables combining log files and telemetry having disparate formats into a unified behavioral cybersecurity graph. More particularly, to generate a graph representing the behavior expressed across multiple log files, the log files are processed and analyzed within a cybersecurity ontology to extract key concepts and relations between the key concepts.

Cybersecurity data and information can be expressed using different formats that are adapted to different purposes. For example, log-file formats can be different for different vendors and at different locations across a network, such as at the servers, email, cloud workloads, and endpoints. Further, many of the log files in this telemetry take semi-structured and unstructured forms. The ontology or schema provides a unifying framework that constrains an interpretation of the telemetry and log files, thereby enabling consistent graphs to be constructed that represent cybersecurity behavior in a format that is recognizable and comprehensible to cybersecurity analysts. Thus, the information conveyed by the graphs can provide a better understanding and situational awareness to cybersecurity analysts. Graphs can be used in cybersecurity to capture behavioral patterns for detection and analysis. Additionally, graphs have the benefit that they can be used in automated algorithms. For example, by expressing the behavior of executed computer instructions (e.g., software), graphs can be used in automated searches for malware by comparing the generated graph with a graph that is known to represent the behavior of malware. If the two graphs are isomorphic, then the behavior represented by the two graphs are similar. Thus a significant benefit of representing log files as graphs is that the graphs can be used in automated algorithms for detecting worrisome behavior. That is the conversion to graphs enables many algorithms-like the shortest path and others, which are applicable to security problems. For example, using graphs it is easy to determine whether there is a path from one process to another process via multiple relations (e.g., created file, executed file, deleted file, create event, etc.)

Generally, a cybersecurity ontology is used to describe cybersecurity concepts and relationships between concepts in a cybersecurity field or even a wider range. These concepts and relationships have a common, unambiguous, and unique definition that is agreed on in the shared range. For example, the Unified Cybersecurity Ontology (UCO) model integrates several existing knowledge schemas and standards into a common model for the cybersecurity domain by integrating heterogeneous data and knowledge schemas from various cybersecurity systems, as well as the most commonly used cybersecurity standards for information sharing and exchange.

The methods and systems disclosed herein use a large language model (LLM) to improve efficiency and consistency for generating graphs of cybersecurity behavior from log files and other unstructured or semi-structured telemetry data.

FIG. 1A illustrates a graph-generating system 100 that has an ML method 106, which receives various inputs, including, e.g., an ontology 102 and training log files 104. Based on these inputs, the machine learning method 106 creates regular expressions 108. A regular expression is a sequence of characters that specifies a match pattern in text. For example, in a log file, a time stamp can have a recognizable regular expression. Once this regular expression is known, the time stamps throughout the log file can be quickly searched for and identified. Similarly, IP addresses, MAC addresses, domain names, and other entities can also be identified using regular expressions, making regular expressions a powerful tool for quickly parsing log files especially as the number or size of the log files scales up. The ontology 102 is used to constrain the categories of regular expressions 108, thereby limiting the regular expressions to those relevant for a particular system of interest (e.g., cybersecurity). For example, a log file may include many fields/entries that are not relevant to the particular system of interest, and constraining the generating of the regular expressions can discourage the generation of regular expressions from the fields/entries in the log file that are not relevant. Further, constraining the regular expressions 108 to categories dictated by the ontology 102 helps to ensure that the regular expressions are meaningful within the context of the ontology 102. The ontology 102 defines categories of entities and relationships between entities that are expressed in graphs.

Although an LLM can directly extract the same entities and relations as could be extracted by using regular expressions, using the LLM directly can be relatively computationally expensive compared to using regular expressions. Although using the LLM to determine the regular expressions can be similarly computationally expensive as using the LLM to directly extract entities and relations, the generation of regular expressions is a non-recurring cost, or at least an infrequently recurring cost. Once generated, the regular expressions can be reused again and again on many log files. Thus, as the number of log files scales, using regular expressions becomes more cost-effective. Further, once the regular expressions are generated, parsing data files using the regular expressions is faster than directly using the LLM to entities and relations. Consequently, using regular expressions produced by LLM also speedups the extractions, when processing a large number of log files.

Using the regular expressions 108, a log file parser 112 is able to parse a log file 110, thereby generating a parsed log file 114. The parsed log file 114 can be expressed, e.g., using one of various ontology formats, such as Resource Description Framework (RDF) or as one of various graph data formats. The graph generator 116 then uses the parsed log file 114 to generate a graph 118. And a GUI 120 displays the graph 118. Alternatively or additionally, the graph 118 can be stored or used in queries to find patterns that are indicative of a cybersecurity attack or malicious software (malware). Alternatively or additionally, the graph 118 can be used in other graph-based algorithms such as matching a current behavioral graph with millions of known malware behavioral graphs. Also, the graph 118 can be used for other queries/searches of the graph which can be part of a larger process of finding various security attacks.

Figure 1B:
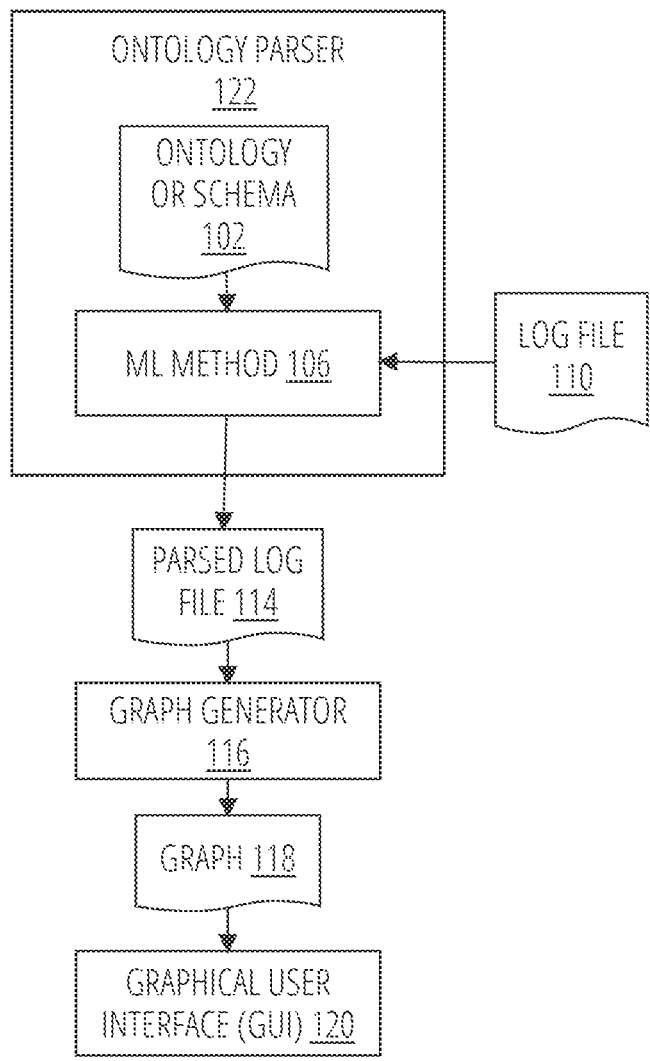
FIG. 1B illustrates a block diagram for another example of a system/device for generating graphs from log files, in accordance with certain embodiments.

FIG. 1B illustrates an alternative implementation of the graph-generating system 100. In FIG. 1B, the graph-generating system 100 includes a ML method 106 that receives as inputs the ontology 102 and the log file 110. Constrained by the ontology 102, the ML method 106 operates directly on the log file 110 to generate the parsed log, rather than generating regular expressions 108 and then using the regular expressions 108 to parse the log file. Once the parsed log file 114 is generated, the graph-generating system 100 proceeds the same as discussed in FIG. 1A.

Figure 2A:
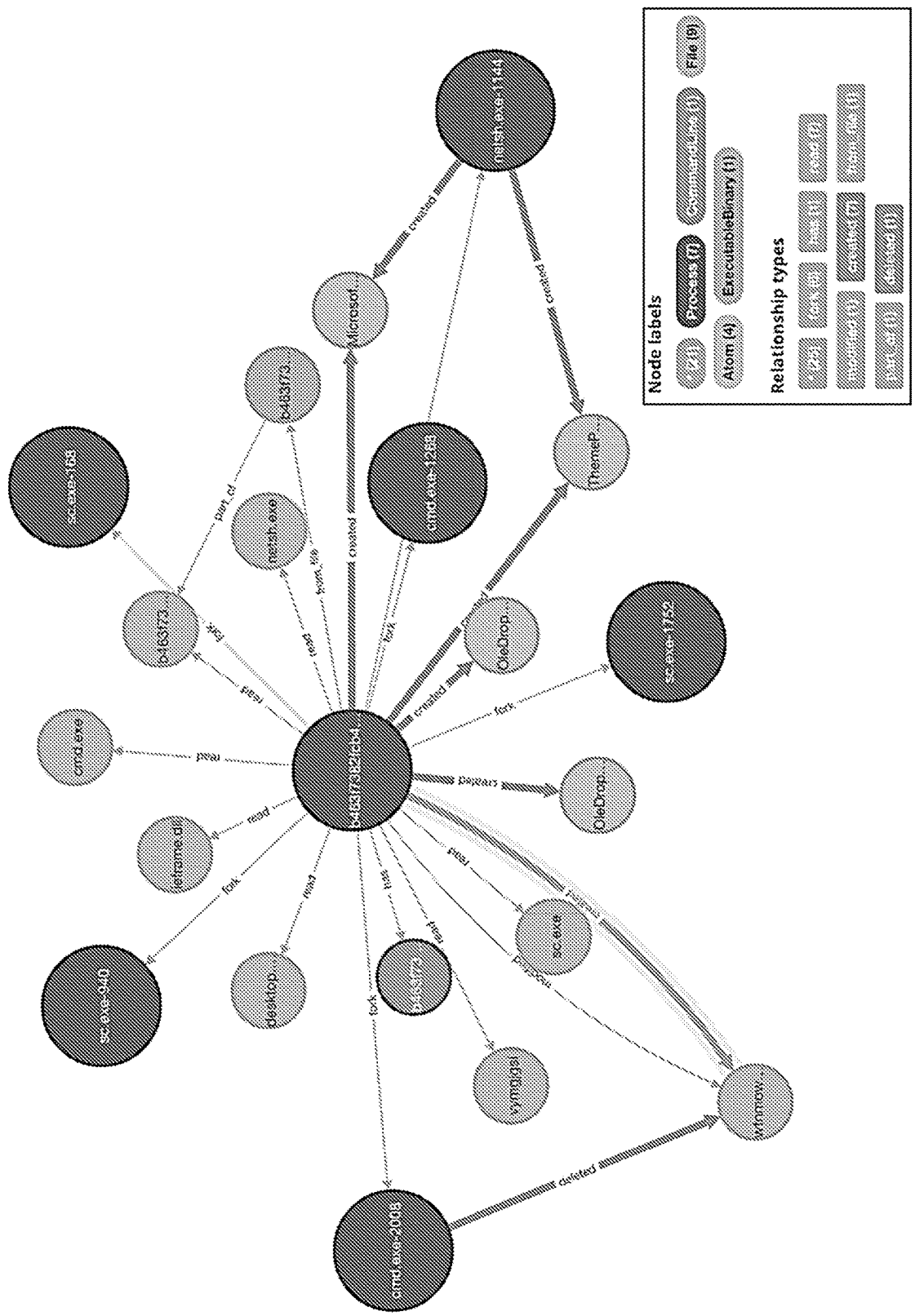
FIG. 2A illustrates a graph modeling behavior of a cyber attack, in accordance with certain embodiments.
Figure 2B:
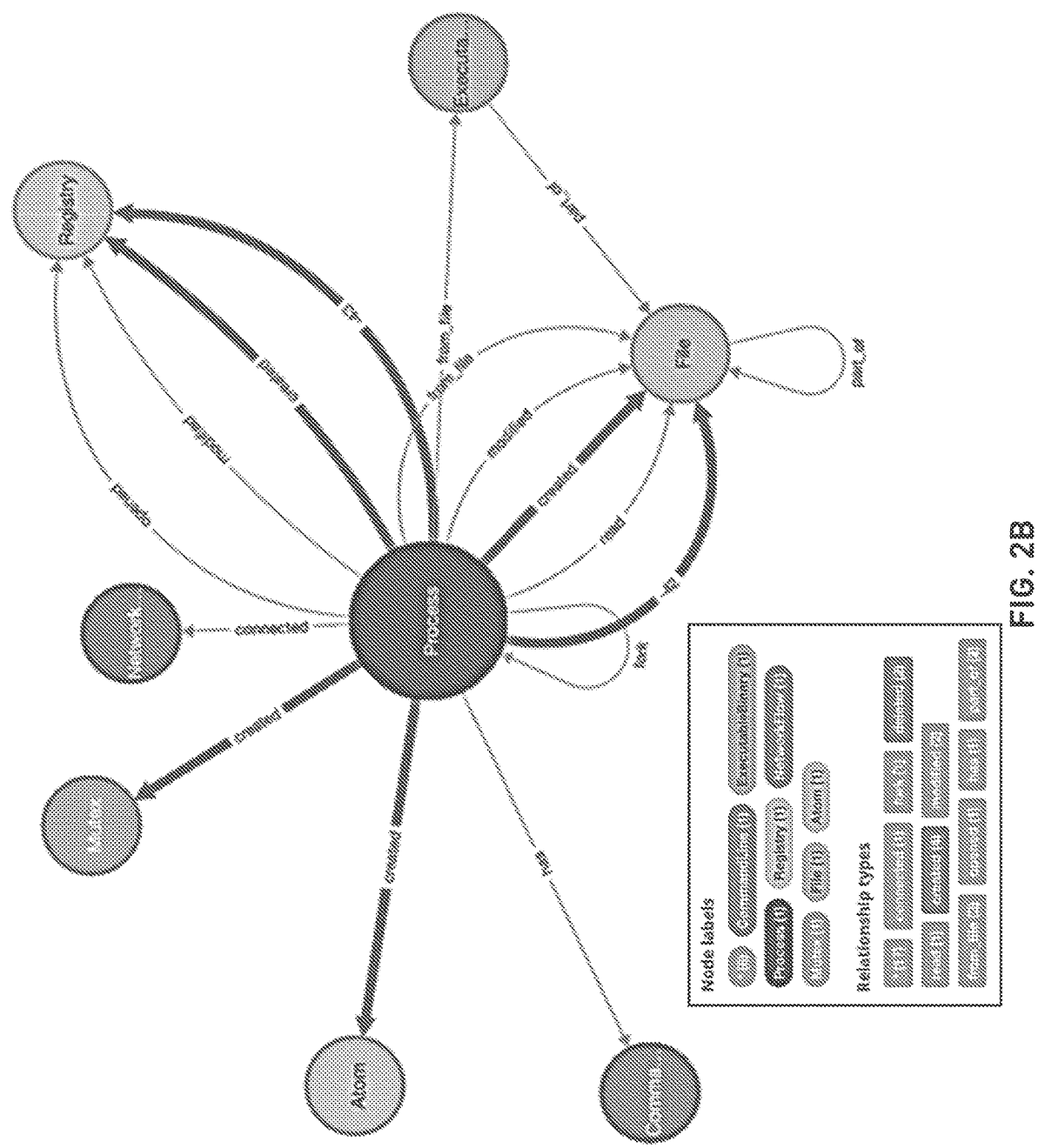
FIG. 2B illustrates a portion of the graph modeling behavior of the cyber attack, in accordance with certain embodiments.

FIG. 2A and FIG. 2B show examples of cybersecurity graphs. The nodes include cybersecurity concepts, such as command line calls, registries, processes, executable binary, applications, network flow, mutual exclusion (mutex) calls, atoms, and files. The directed edges include relationship types, such as fork, has, read, modified, created, part of, deleted, connected, opened, etc. FIG. 2B is representative of a graph representing the ontology itself, and FIG. 2A is representative of a graph representing data after the ontology has been applied to the data.

Because the categories of the nodes and the directed edges derive from the entities and relationships parsed from the log files, constraining the entities and relationships based on a cybersecurity ontology guides the mappings from the log files to the graphs to generate graphs that represent the relevant cybersecurity behavior expressed in the log files.

This guided/constrained mapping from log files to graphs can be achieved by (i) using the LLM constrained by the cybersecurity ontology or schema to generate regular expressions that are then used to parse the log files, as illustrated in FIG. 1A, or (ii) using the LLM constrained by the cybersecurity ontology or schema to directly parse the log files to provide the entities and relationships that are used to generate the graphs. When a large number of log files are to be parsed, the first approach has the advantage of being faster and using fewer processing resources because the regular expressions can be learned once and parsing the log files using regular expressions can be much quicker than parsing the log files using an LLM.

To build such cybersecurity behavioral graphs, data is often collected at different observation points, for example, observing behaviors of the processes, file access, network access, registry, and more. Additionally, the log files (also abbreviated as "logs") are often large, unstructured data files that form part of security telemetry. Logs from different vendors and systems present complex parsing challenges, especially for the particular problem of parsing the logs to extract key concepts (e.g., the entities), and the relationships between them. The problem is further complicated by a large number of different vendors producing their own formats and by the added complication that log formats can continuously by modified the vendors and such modifications are not necessarily well documented.

The graph-generating systems 100 illustrated in FIG. 1A and FIG. 1B use LLMs to aid in automating the process of ingesting and parsing logs of any format. For example, the LLMs are able to extract entities and relations between them from the logs 110. Such extracted data can then be used to build a cybersecurity graph 118 when processing log files 110 as inputs.

When the volume of security logs can be very large, processing such volumes with LLM models can be prohibitively expensive. Accordingly, the graph-generating system 100 illustrated in FIG. 1A uses an ML method 106 (e.g., one or more LLMs) to produce regular expressions, and these regular expressions are used to parse a given set of log files into entities and relationships between them, thereby more efficiently extracting the entities and relationships from the log files.

A regular expression (also abbreviated as "regex" or "regexp") is a sequence of characters that specifies a match pattern in text. Often such patterns are used by string-searching algorithms for "find" operations on strings, or for input validation. For example, email addresses conform to a standard pattern that can be captured by the regular expression «regex» (herein regular expressions are presented between guillemots) «\b[A-Z0-9._%-]+@[A-Z0-9.-]+\.[A-Z]{2,4}\b». This pattern describes a series of letters, digits, dots, underscores, percentage signs and hyphens, followed by an at sign, followed by another series of letters, digits and hyphens, finally followed by a single dot and between two and four letters (i.e., the pattern of an email address). FIG. 3 illustrates various special characters that can be used in defining regular expressions.

Now an example is provided of using an LLM to derive regular expressions. Consider, for example, the following portion of an Nginx log file:

TLSv1.2 AES128-SHA1.11.1"Mozilla/5.0 (X11; Linux x86_64; rv:45.0) Gecko/20100101 Firefox/45.0"

TLSv1.2 ECDHE-RSA-AES128-GCM-SHA256 2.2.2.2 "Mozilla/5.0 (iPhone; CPU iPhone OS 91 like Mac OS X) AppleWebKit/601.1.46 (KHTML, like Gecko) Version/9.0 Mobile/136143 Safari/6011"

TLSv1.2 ECDHE-RSA-AES128-GCM-SHA256 3.3.3.3 "Mozilla/5.0 (Windows NT 6.1; WOW64; rv:58.0) Gecko/20100101 Firefox/58.0"

TLSv1.2 ECDHE-RSA-AES128-GCM-SHA256 4.4.4.4 "Mozilla/5.0 (Android 4.4.2; Tablet; rv:65.0) Gecko/65.0 Firefox/65.0"

TLSv1 AES128-SHA 5.5.5.5 "Mozilla/5.0 (Android 4.4.2; Tablet; rv:65.0) Gecko/65.0 Firefox/65.0"

TLSv1.2 ECDHE-RSA-CHACHA20-POLY1305 6.6.6.6 "Mozilla/5.0 (Linux; U; Android 5.0.2; en-US; XT1068 Build/LXB22.46-28) AppleWebKit/537.36 (KHTML, like Gecko) Version/4.0 Chrome/57.0.2987.108 UCBrowser/12.10.2.1164 Mobile Safari/537.36

Using CHATGPT, the following prompt "Parse out information according to the JSON schema below and return the information in JSON format (italics):

```
{
"$schema": "https://json-schema.org/draft/2020-12/schema",
"title": "Nginx Log Entry Schema",
"type": "object",
"properties": {
   "protocol": { "type": "string" },
   "encryption": { "type": "string" },
   "ip": { "type": "string" },
   "user_agent": { "type": "string" }
 }
} "
``` can be used to generate the output (italics):

```
{
    "protocol": "TLSv1.2",
    "encryption": "AES128-SHA",
    "ip": "1.1.1.1",
    "user_agent": "Mozilla/5.0 (X11; Linux x86_64; rv:45.0) Gecko/20100101
Firefox/45.0"
}
{
  "protocol": "TLSv1.2",
  "encryption": "ECDHE-RSA-AES128-GCM-SHA256",
    "ip": "2.2.2.2",
   "user_agent": "Mozilla/5.0 (iPhone; CPU iPhone OS 9_1 like Mac OS X)
Apple WebKit/601.1.46 (KHTML, like Gecko) Version/9.0 Mobile/13B143 Safari/601.1"
  } ...
```

The values "protocol," "encryption," "ip," and "user_agent" are consistent with the JSON schema provided in the prompt. CHATGPT can be further prompted to generate regular expression to parse information according to JSON schema provided. For example, when prompted "Provide a regular expression to parse out the information from this log file according to provided JSON schema with regex group names matching fields in schema.", CHATGPT can return the regular expression:

«TLS(?P<protocol>v[0-9]\.[0-9])\s(?P<encryption>[A-Za-z0-9\-]+)\s(?P<ip>[0-9]+\.[0-9]+\.0-9]+\.[0-9]+)\s"(?P<user_agent>["]+)».

This regular expression can be used to parse information from the above format of logs. This regular expression uses named capturing groups to extract the information from each log according to JSON schema provided in the prompt. This regular expression can be used in a program that is used to extract the information from each log and convert it into a JSON object.

When this process of learning the regular expressions is guided/constrained by a cybersecurity ontology or schema, the regular expressions will fall within categories/types that are pertinent to cybersecurity behavioral graphs.

Figure 4A:
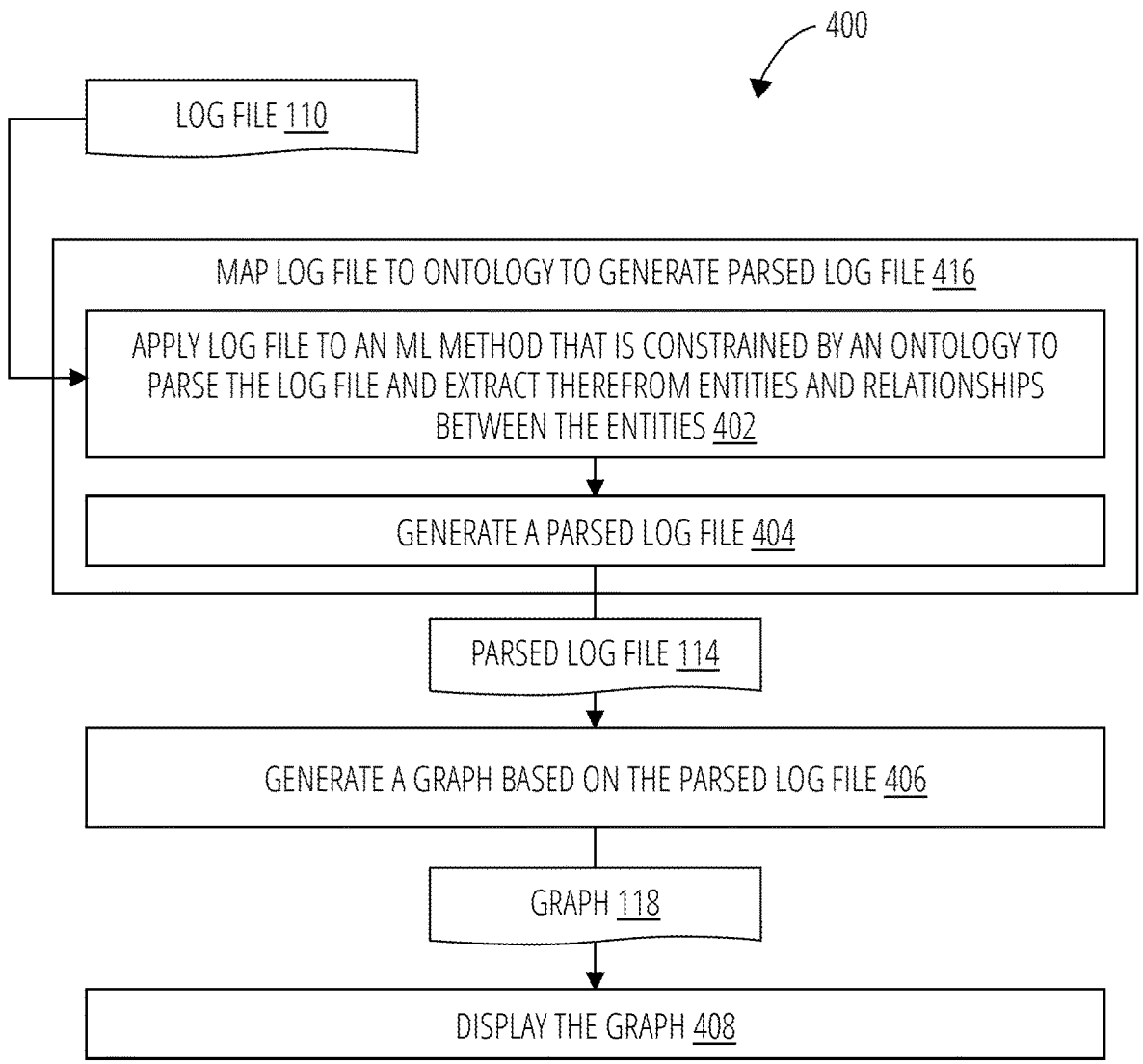
FIG. 4A illustrates a flow diagram for an example of a method for generating graphs from log file, in accordance with certain embodiments.

FIG. 4A illustrates an example method 400 for generating a graph representing cybersecurity behavior from log files 110. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, process 416 includes two steps: step 402 and step 404. In step 402, method 400 includes applying log files 110 to an ML method that is constrained by an ontology or schema. The ML method determines character strings (e.g., terms and phrases) in the log files 110 that represent entities and relationships between entities that correspond to concepts in the ontology. In step 404, a parsed log file 114 is generated that includes the extracted entities and relationships from the log files 110.

According to some examples, in step 406, a graph 118 is generated from the parsed log file 114. For example, nodes can be generated in the graph 118 for the respective entities extracted from the log files 110, and the edges can be added to the graph 118 based on the relationships between entities that are extracted from the log files 110.

According to some examples, in step 408, the graph 118 is displayed in a graphical user interface (GUI).

The non-limiting example of method 400 illustrated FIG. 4A corresponds to the graph-generating system 100 in which the intermediate step of generating regular expressions is not required for the process of mapping the information in log files to cybersecurity behavioral graphs.

Figure 4B:
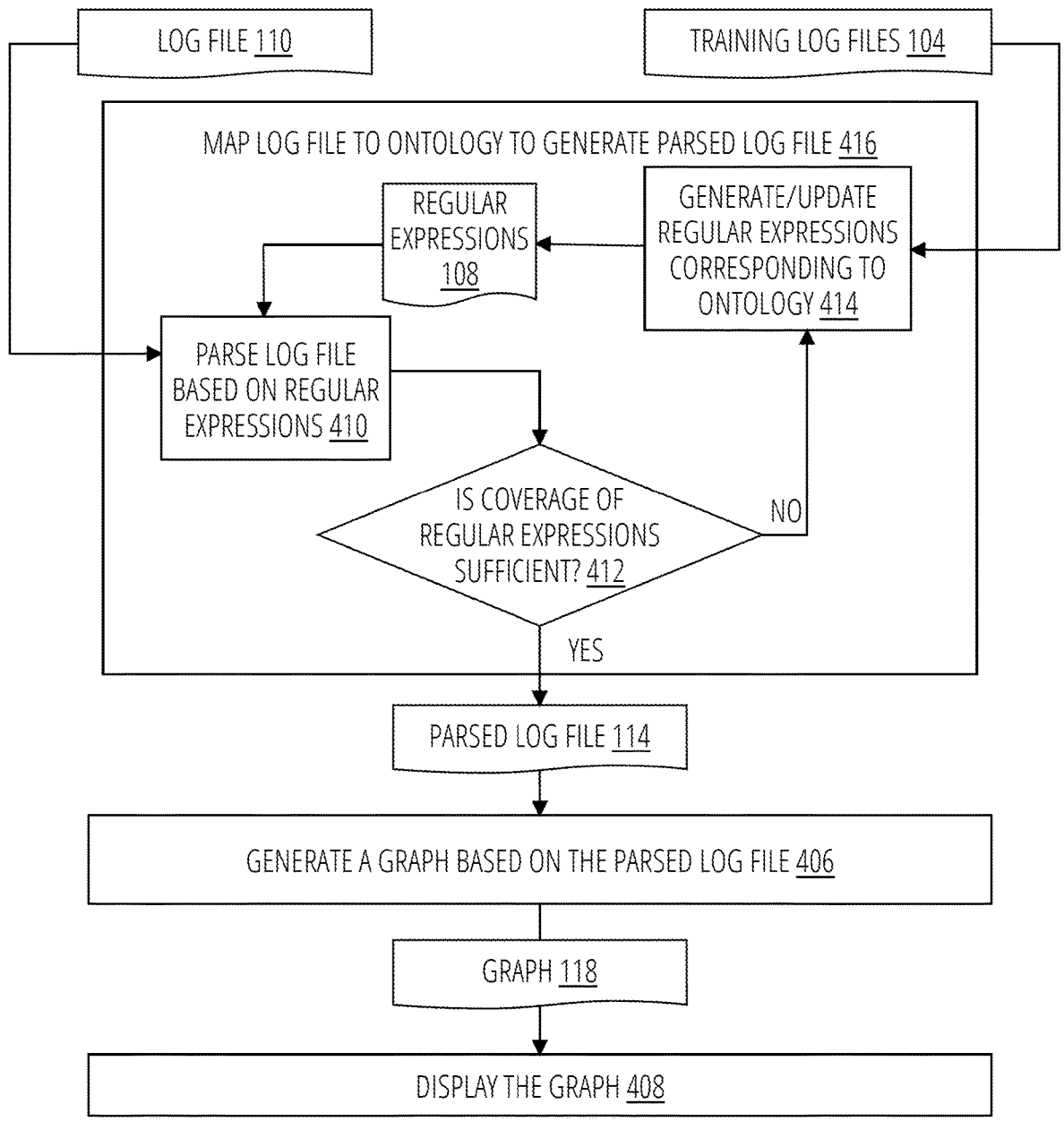
FIG. 4B illustrates a flow diagram for another example of a method for generating graphs from log file, in accordance with certain embodiments.

FIG. 4B illustrates an example routine of method 400 that includes the intermediate step of generating regular expressions as part of the process for mapping log files to cybersecurity behavioral graphs. This example of method 400 corresponds to the graph-generating system 100 illustrated in FIG. 1A.

Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, process 416 includes three steps: step 410, decision block 412, and step 414. In step 414, training log files 104 are used to learn the patterns of character strings for regular expressions 108 that can be used to parse a particular format of log files. Different sets of regular expressions 108 can be used for different file formats. Step 414 can be performed by an LLM, such as CHATGPT. Step 414 is performed initially to generate the regular expressions 108, and can be repeated to update the regular expressions 108 whenever the coverage of the regular expressions 108 is insufficient, as determined in decision block 412.

In step 410, the regular expressions 108 are used to parse the log files 110.

In decision block 412, an inquire is performed to determine whether the coverage of regular expressions is sufficient? When the coverage of the regular expressions 108 is insufficient, the regular expressions 108 are updated using a new set of training log files 104. For example, the format of the log files can change over time, making it beneficial to learn the new format and learn new patterns for the regular expressions 108. Then the updated regular expressions 108 can be used in step 410 to parse the log files 110. The quality of the regular expressions 108 is reflected in how well the entities and relationships expressed in the log file 110 are recognized and extracted when performing the parsing.

For example, the regular expression «\b[A-Z0-9._%-]+@[A-Z0-9.-]+\.[A-Z]{2.4}\b» should capture 100% of email address, and is therefore very good at recognizing and extracting email addresses. The regular expression «\b[A-Z0-9._%-]+@[A-Z0-9.-]+\.com» is less good for email addresses because it would only capture email addresses that end in .com". Similarly, the effectiveness and sufficiency of the regular expressions 108 can be monitored in 412 using various metrics, such as what percentage of the characters in the log file 110 are matched by the regular expressions 108. Updating the regular expressions 108 can be triggered when one or more of these metrics falls below a predefined threshold.

When properly defined, the regular expressions can find all relevant entities. Various techniques can be used to verify that the regular expressions are properly tuned. For example, regular expressions that were properly tuned to a given type of log files (e.g., JSON log files) might no longer be properly tuned if the format is changed for that type of log files. Upon the change to the format, the decision block 412 detects that the regular expressions are no longer sufficient.

For example, baseline statistics can be accumulated regarding the density/frequency of extracted "times stamp" entities within a typical log file. Significant deviations of the density/frequency of extracted "times stamp" entities compared to this baseline can be an indicator (e.g., metric indicating the health of the regular expressions) that the regular expressions should be updated in step 414. To avoid unnecessary updates to the regular expressions 108, the metrics can be averaged over a predefined interval to reduce statistical variations arising from log files that are statistical outliers.

Alternatively or additionally, in addition to extracting entities and relations using the regular expressions, the regular expressions can be analyzed by directly extracting entities and relations using the LLM, and the sufficiency of regular expressions can be tested by comparing the entities and relations that were extracted using the different approaches. When the regular expressions are sufficient, the different approaches should extract the same entities and relations. The entities and relations that are extracted directly using the LLM will not be sensitive to changes in format for the log files. Thus, a divergence between the entities and relations that were extracted using the different approaches would be indicative of a format change, signaling that the regular expressions should be updated in step 414.

Alternatively or additionally, a two-step approach can be used in which the comparison to the LLM-extracted entities and relations is only performed infrequently, due to the computational cost, but the comparison to a statistical baseline is performed frequently. When a significant deviation from the statistical baseline is detected, then the comparison to the LLM-extracted entities and relations is only performed to confirm whether the regular expressions are to be updated in step 414.

The decision block 412 can monitor the sufficiency of the regular expressions 108 with respect to both false positives and false negatives. Further, the decision block 412 can monitor the sufficiency of the regular expressions with respect to different categories and concepts in the log files. For example, if the statistical prevalence of timestamp entities is known for a particular format of log files, then a drastic decrease in the extraction of timestamp entities can be an indicator that the format of the timestamp entities has changed and the regular expression for the timestamp entities should be updated. Further, baseline statistics can be learned for different types/categories of entities and different types/categories of relationships. Then the statistics for these can be monitored and compared to the baseline to detect changes, which changes can indicate that format has changes to thereby trigger an update of the regular expressions 108.

Steps 406 and 408 are the same as described above with reference to FIG. 4A. Accordingly, there description is not repeated here.

Figure 5A:
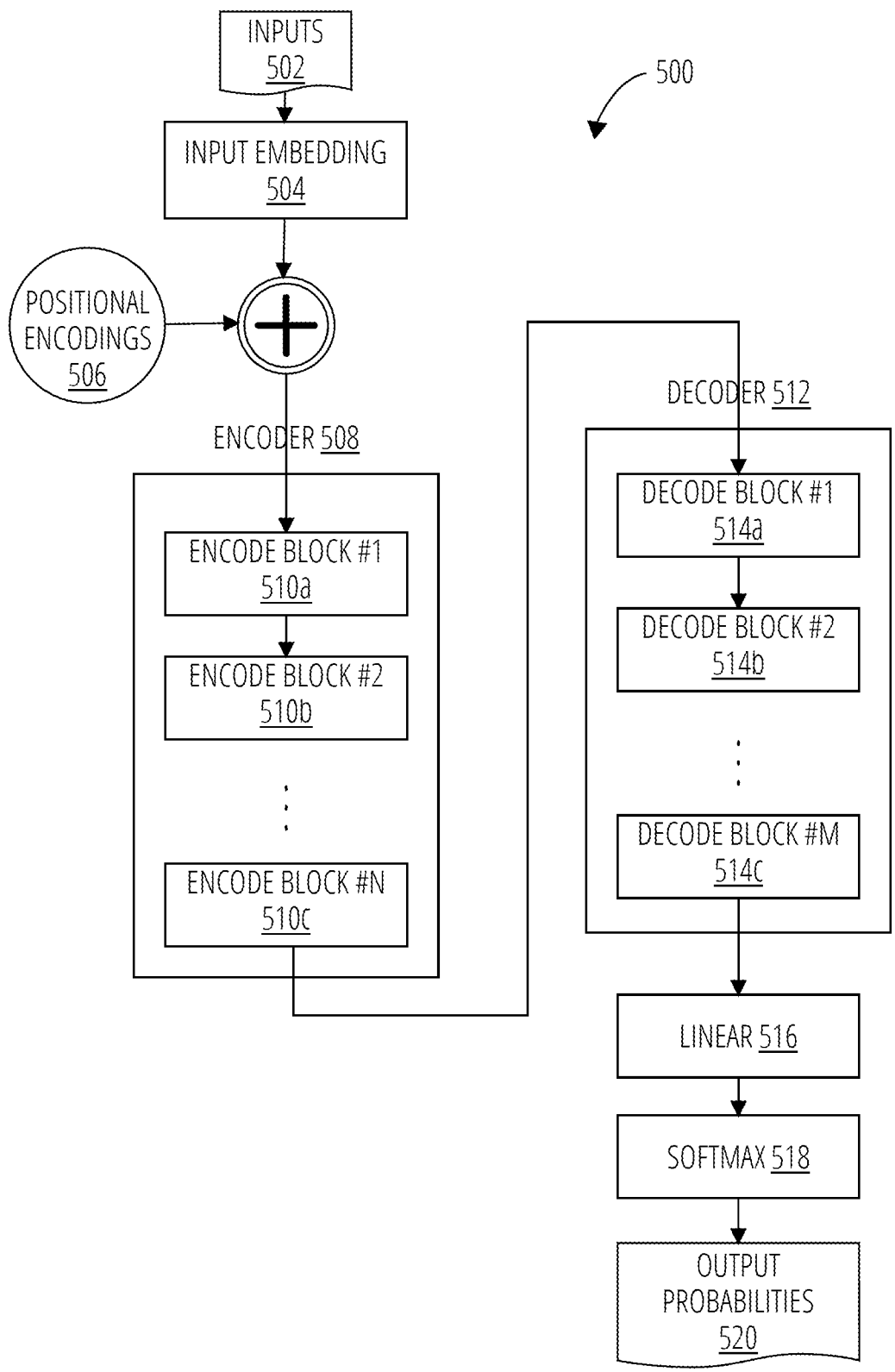
FIG. 5A illustrates a block diagram for an example of a transformer neural network architecture, in accordance with certain embodiments.
Figure 5B:
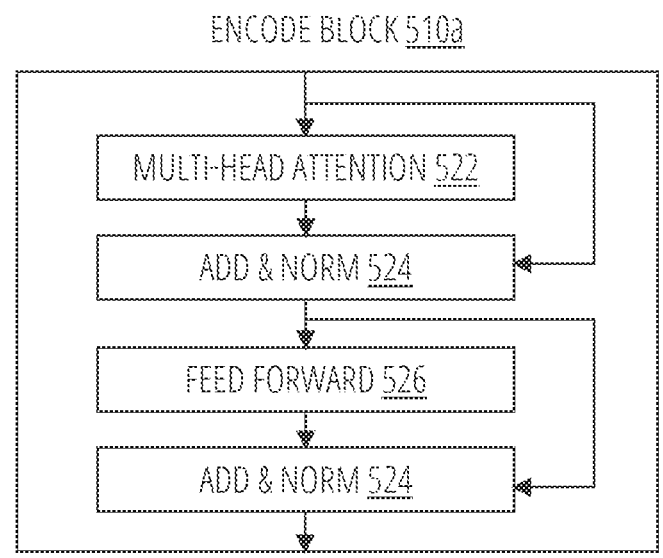
FIG. 5B illustrates a block diagram for an example of an encoder of the transformer neural network architecture, in accordance with certain embodiments.
Figure 5C:
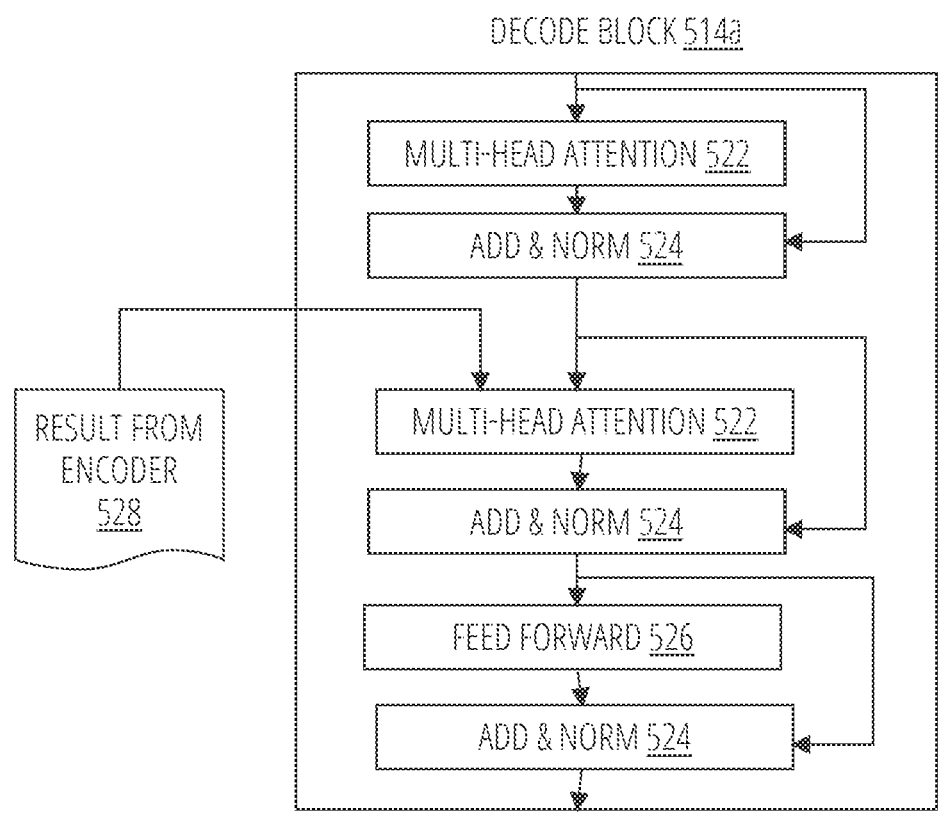
FIG. 5C illustrates a block diagram for an example of a decoder of the transformer neural network architecture, in accordance with certain embodiments.

Many different LLMs can be used for the ML method 106. In certain non-limiting examples, a transformer neural network can be used as the ML method 106 in FIG. 1A and FIG. 1B. For example, the ML method 106 could use a Bidirectional Encoder Representations from Transformer (BERT) or a Generative Pre-trained Transformer (GPT). The transformer architecture 500, which is illustrated in FIG. 5A through FIG. 5C, includes inputs 502, an input embedding block 504, positional encodings 506, an encoder 508 (e.g., encode blocks 410a, 410b, and 510c), a decoder 512 (e.g., decode blocks 414a, 414b, and 514c), a linear block 516, a softmax block 518, and output probabilities 520.

The inputs 502 can include log files. The transformer architecture 500 is used to determine output probabilities 520 regarding regular expressions. Alternatively or additionally, The transformer architecture 500 is used to determine output probabilities 520 for parsed log files by parsing the log files directly as a one-step process, rather than the two-step process of generating regular expressions using the transformer architecture 500 and then using the regular expressions to parse the log files.

The input embedding block 504 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 504 can be learned embeddings to convert the input tokens and output tokens to vectors of dimension have the same dimension as the positional encodings, for example.

The positional encodings 506 provide information about the relative or absolute position of the tokens in the sequence. According to certain non-limiting examples, the positional encodings 506 can be provided by adding positional encodings to the input embeddings at the inputs to the encoder 508 and decoder 512. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that so doing allows the model to extrapolate to sequence lengths longer than the ones encountered during training.

The encoder 508 uses stacked self-attention and point-wise, fully connected layers. The encoder 508 can be a stack of N identical layers (e.g., N=6), and each layer is an encode block 410, as illustrated by encode block 510a shown in FIG. 5B. Each encode block 410 has two sub-layers: (i) a first sub-layer has a multi-head attention block 522 and (ii) a second sub-layer has a feed forward block 526, which can be a position-wise fully connected feed-forward network. The feed forward block 526 can use a rectified linear unit (ReLU).

The encoder 508 uses a residual connection around each of the two sub-layers, followed by an add & norm block 524, which performs normalization (e.g., the output of each sub-layer is LayerNorm(x+Sublayer(x)), i.e., the product of a layer normalization "LayerNorm" time the sum of the input "x" and output "Sublayer(x)" pf the sublayer LayerNorm(x+Sublayer(x)), where Sublayer(x) is the function implemented by the sub-layer). To facilitate these residual connections, all sub-layers in the model, as well as the embedding layers, produce output data having a same dimension.

Similar to the encoder 508, the decoder 512 uses stacked self-attention and point-wise, fully connected layers. The decoder 512 can also be a stack of M identical layers (e.g., M=6), and each layer is a decode block 414, as illustrated by encode decode block 514a shown in FIG. 5C. In addition to the two sub-layers (i.e., the sublayer with the multi-head attention block 522 and the sub-layer with the feed forward block 526) found in the encode block 510a, the decode block 514a can include a third sub-layer, which performs multi-head attention over the output of the encoder stack. Similar to the encoder 508, the decoder 512 uses residual connections around each of the sub-layers, followed by layer normalization. Additionally, the sub-layer with the multi-head attention block 522 can be modified in the decoder stack to prevent positions from attending to subsequent positions. This masking, combined with fact that the output embeddings are offset by one position, ensures that the predictions for position i can depend only on the known output data at positions less than i.

The linear block 516 can be a learned linear transformation. For example, when the transformer architecture 500 is being used to translate from a first language into a second language, the linear block 516 projects the output from the last decode block 514c into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

The softmax block 518 then turns the scores from the linear block 516 into output probabilities 520 (which add up to 1.0). In each position, the index provides for the word with the highest probability, and then map that index to the corresponding word in the vocabulary. Those words then form the output sequence of the transformer architecture 500. The softmax operation is applied to the output from the linear block 516 to convert the raw numbers into the output probabilities 520 (e.g., token probabilities).

Figure 6A:
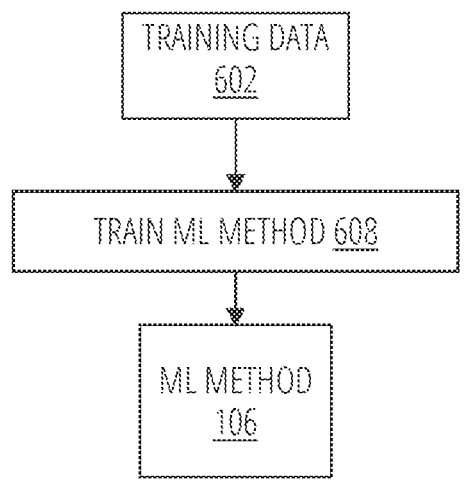
FIG. 6A illustrates a flow diagram for an example of a method of training a neural network, in accordance with certain embodiments.

FIG. 6A illustrates an example of training an ML method 106. In step 608, training data 602 is applied to train the ML method 106. For example, the ML method 106 can be an artificial neural network (ANN) that is trained via unsupervised or self-supervised learning using a backpropagation technique to train the weighting parameters between nodes within respective layers of the ANN.

The advantage of the transformer architecture 500 is that it can be trained through self-supervised learning or unsupervised methods. The Bidirectional Encoder Representations from Transformer (BERT), for example, does much of its training by taking large corpora of unlabeled text, masking parts of it, and trying to predict the missing parts. It then tunes its parameters based on how much its predictions were close to or far from the actual data. By continuously going through this process, the transformer architecture 500 captures the statistical relations between different words in different contexts. After this pretraining phase, the transformer architecture 500 can be finetuned for a downstream task such as question answering, text summarization, or sentiment analysis by training it on a small number of labeled examples.

In unsupervised learning, the training data 602 is applied as an input to the ML method 106, and an error/loss function is generated by comparing the predictions of the next word in a text from the ML method 106 with the actual word in the text. The coefficients of the ML method 106 can be iteratively updated to reduce an error/loss function. The value of the error/loss function decreases as outputs from the ML method 106 increasingly approximate the labels 604.

For example, in certain implementations, the cost function can use the mean-squared error to minimize the average squared error. In the case of a of multilayer perceptrons (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of numerous algorithms for training neural network models (e.g., by applying optimization theory and statistical estimation).

For example, the optimization method used in training artificial neural networks can use some form of gradient descent, using backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., Broyden- Fletcher-Goldfarb-Shannon, one step secant, and Levenberg-Marquardt), or a conjugate gradient method (e.g., Fletcher-Reeves update, Polak-Ribićre update, Powell-Beale restart, and scaled conjugate gradient). Additionally, evolutionary methods, such as gene expression programming, simulated annealing, expectation-maximization, non-parametric methods and particle swarm optimization, can also be used for training the ML method 106.

The training 608 of the ML method 106 can also include various techniques to prevent overfitting to the training data 602 and for validating the trained ML method 106. For example, bootstrapping and random sampling of the training data 602 can be used during training.

In addition to supervised learning used to initially train the ML method 106, the ML method 106 can be continuously trained while being used by using reinforcement learning.

Further, other machine learning (ML) algorithms can be used for the ML method 106, and the ML method 106 is not limited to being an ANN. For example, there are many machine-learning models, and the ML method 106 can be based on machine learning systems that include generative adversarial networks (GANs) that are trained, for example, using pairs of network measurements and their corresponding optimized configurations.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 6B:
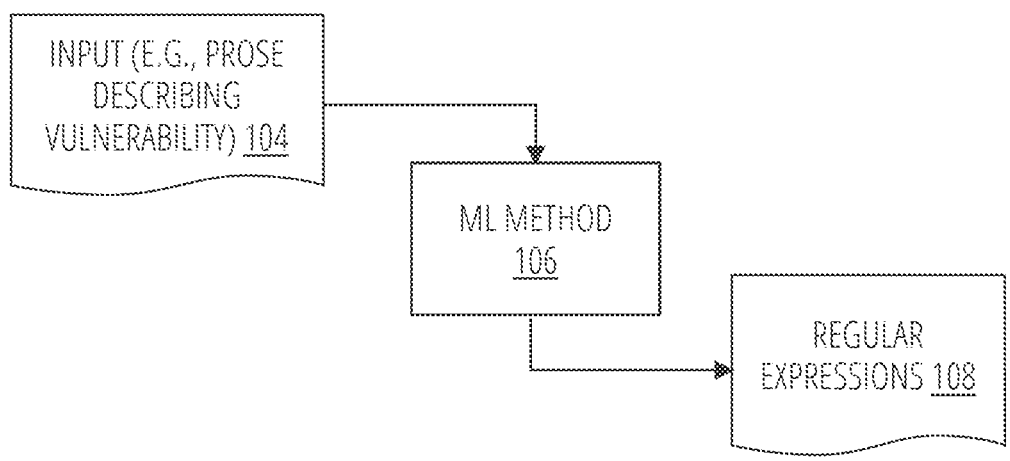
FIG. 6B illustrates a flow diagram for an example of a method of using the trained neural network, in accordance with certain embodiments.

FIG. 6B illustrates an example of using the trained ML method 106. The training log files 104 are applied to the trained ML method 106 to generate the outputs, which can include the regular expressions 108.

Figure 7:
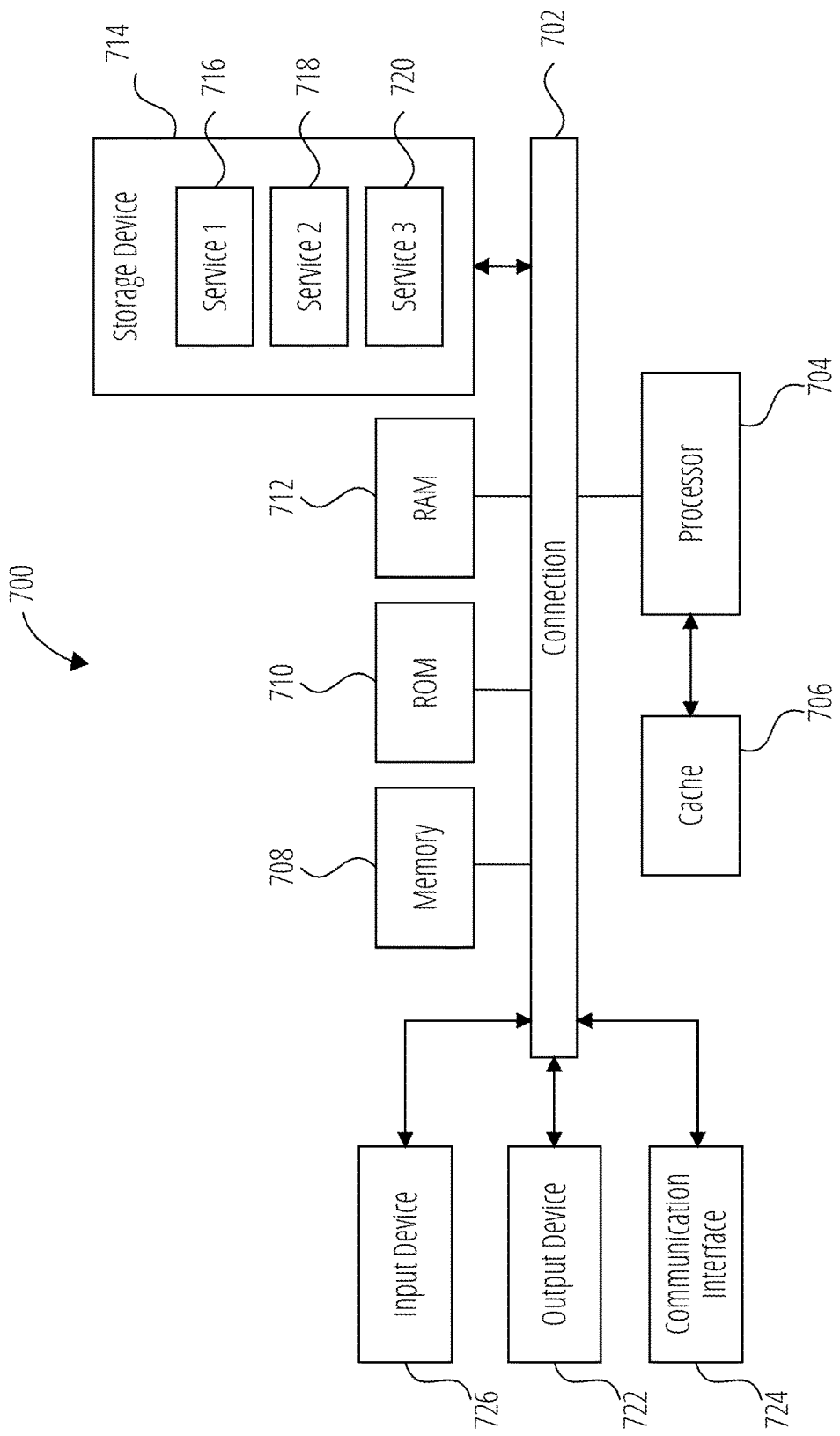
FIG. 7 illustrates a block diagram for an example of a computing device, in accordance with certain embodiments.

FIG. 7 shows an example of computing system 700, which can be for example any computing device configured to perform one or more of the steps of method 400; any computing device making up the graph-generating system 100; or any component thereof in which the components of the system are in communication with each other using connection 702. Connection 702 can be a physical connection via a bus, or a direct connection into processor 704, such as in a chipset architecture. Connection 702 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 700 includes at least one processing unit (CPU or processor) 704 and connection 702 that couples various system components including system memory 708, such as read-only memory (ROM) 610 and random access memory (RAM) 612 to processor 704. Computing system 700 can include a cache of high-speed memory 706 connected directly with, in close proximity to, or integrated as part of processor 704.

Processor 704 can include any general purpose processor and a hardware service or software service, such as services 716, 718, and 720 stored in storage device 714, configured to control processor 704 as well as a special-purpose processor where software instructions are incorporated into the actual processor design. Processor 704 may essentially be a completely self-contained computing system, containing multiple cores or processors, a bus, memory controller, cache, etc. A multi-core processor may be symmetric or asymmetric.

To enable user interaction, computing system 700 includes an input device 726, which can represent any number of input mechanisms, such as a microphone for speech, a touch-sensitive screen for gesture or graphical input, keyboard, mouse, motion input, speech, etc. Computing system 700 can also include output device 722, which can be one or more of a number of output mechanisms known to those of skill in the art. In some instances, multimodal systems can enable a user to provide multiple types of input/output to communicate with computing system 700. Computing system 700 can include communication interface 624, which can generally govern and manage the user input and system output. There is no restriction on operating on any particular hardware arrangement, and therefore the basic features here may easily be substituted for improved hardware or firmware arrangements as they are developed.

Storage device 714 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 714 can include software services, servers, services, etc., that when the code that defines such software is executed by the processor 704, it causes the system to perform a function. In some embodiments, a hardware service that performs a particular function can include the software component stored in a computer-readable medium in connection with the necessary hardware components, such as processor 704, connection 702, output device 722, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a graph-generating system 100 and perform one or more functions of the method 400 when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of generating a graph from a data file comprising unstructured or semi-structured data, the method comprising:
applying a data file to a machine learning (ML) method and generating from the data file, entities and relations between said entities, wherein the entities and the relations are constrained by a predefined ontology or a predefined schema;
generating a graph using the entities and relations that are generated from the data file;
applying the data file to the ML method to generate regular expressions, wherein the regular expressions comprise patterns for how the entities and the relations are expressed in the data file, and the regular expressions are constrained by the predefined ontology or the predefined schema;
generating other entities and other relations by parsing another data file using the regular expressions generated from the data file, the parsed another data comprising the other entities and the other relations; and
calculating a score based on comparing statistics of the other entities and/or the other relations to baseline statistics for the entities and/or the relations;
comparing the score to a predefined threshold; and
determining that one or more criteria are met when the score exceeds the predefined threshold thereby indicating that the regular expressions are not effective for parsing the another data file; and
in response to the regular expressions generated from the data file being determined to not be effective for parsing the another data file, updating the regular expressions with additional entities and additional relations that are constraint entities categories of the predefined ontology or the predefined schema.

2. The method of claim 1, further comprising:
parsing the data file using the regular expressions to generate parsed data representing a semantic content of the data file; and
generating the graph from the parsed data.

3. The method of claim 2, wherein
the graph provides a visualization of cybersecurity behavior conveyed by the data file, and/or
the graph provides a topological representation of the behavior conveyed by the data file, and an isomorphism between the topological representation and a topology of an other graph is used to determine a similarity of the behavior conveyed by the data file to a behavior conveyed by the other graph.

4. The method of claim 2, further comprising:
generating another graph from the parsed another data.

5. The method of claim 4, further comprising:
monitoring the parsing of the another data file to determine whether the regular expressions generated from the data file are effective for parsing the another data file.

6. The method of claim 1, wherein:
the data file comprises a log file that has a file format selected from the group consisting of Common Log Format (CLF); a JavaScript Object Notation (JSON) format; a Windows Event logs format; a Common Event Format (CEF); Extended Log Format (ELF); a W3C Extended Log File format; an Event Log format; a Server Log format; a System Log (syslog) format; an Authorization Log format; a Access Log format; a Change Log format; an Availability Log format; a Resource Log format; a Threat Logs: format; an Endpoint Security Log format.

7. The method of claim 1, further comprising:
displaying the graph in a graphical user interface (GUI).

8. The method of claim 1, wherein:
the ML method is a large language model (LLM), and generating the regular expressions includes providing the data file to the LLM together with an instruction to generate the regular expressions from the data file.

9. The method of claim 8, further comprising:
evolving the regular expressions based on an error function to minimize the error function, wherein the error function represents an effectiveness of the regular expressions for parsing the data file and parsing another data file.

10. A computing apparatus comprising:
a processor; and
a memory storing instructions that, when executed by the processor, configure the apparatus to:
apply a data file to a machine learning (ML) method and generating from the data file, entities and relations between said entities, wherein the entities and the relations are constrained by a predefined ontology or a predefined schema;
generate a graph using the entities and relations that are generated from the data file;
apply the data file to the ML method to generate regular expressions, wherein the regular expressions comprise patterns for how the entities and the relations are expressed in the data file, and the regular expressions are constrained by the predefined ontology or the predefined schema;
generate other entities and other relations by parsing another data file using the regular expressions generated from the data file, the parsed another data comprising the other entities and the other relations; and
calculate a score based on comparing statistics of the other entities and/or the other relations to baseline statistics for the entities and/or the relations;
compare the score to a predefined threshold; and
determine that one or more criteria are met when the score exceeds the predefined threshold thereby indicating that the regular expressions are not effective for parsing the another data file; and
in response to the regular expressions generated from the data file being determined to not be effective for parsing the another data file, update the regular expressions with additional entities and additional relations that are constraint entities categories of the predefined ontology or the predefined schema.

11. The computing apparatus of claim 10, wherein, when executed by the processor, the stored instructions further configure the apparatus to:
generate the graph from the parsed data.

12. The computing apparatus of claim 11, wherein, when executed by the processor, the stored instructions further configure the apparatus to:
generate another graph from the parsed another data.

13. The computing apparatus of claim 12, wherein, when executed by the processor, the stored instructions further configure the apparatus to:
monitor the parsing of the another data file to determine whether the regular expressions generated from the data file are effective for parsing the another data file.

14. The computing apparatus of claim 13, wherein:
the data file comprises a log file that has a file format selected from the group consisting of Common Log Format (CLF); a JavaScript Object Notation (JSON) format; a Windows Event logs format; a Common Event Format (CEF); Extended Log Format (ELF); a W3C Extended Log File format; an Event Log format; a Server Log format; a System Log (syslog) format; an Authorization Log format; a Access Log format; a Change Log format; an Availability Log format; a Resource Log format; a Threat Logs: format; an Endpoint Security Log format.

15. The computing apparatus of claim 11, wherein
the ML method is a large language model (LLM), and generating the regular expressions includes providing the data file to the LLM together with an instruction to generate the regular expressions from the data file, and evolve the regular expressions based on an error function to minimize the error function, wherein the error function represents an effectiveness of the regular expressions for parsing the data file and parsing another data file.

16. The computing apparatus of claim 11, wherein, when executed by the processor, the stored instructions further configure the apparatus to:
apply another data file to the ML method to generate another regular expressions, wherein the another regular expressions comprise another entities and another relations that are constrained by the predefined ontology or the predefined schema, and the data file is a first type of log file and the another data file is a second type of log file;
use the regular expressions when parsing logs filed of the first type; and
use the another regular expressions when parsing logs filed of the second type.

17. A non-transitory computer readable memory storing instructions programmed to cooperate with a system of electronic computer hardware in combination with software to perform operations comprising:
apply a data file to a machine learning (ML) method and generating from the data file, entities and relations between said entities, wherein the entities and the relations are constrained by a predefined ontology or a predefined schema;
generate a graph using the entities and relations that are generated from the data file;
apply the data file to the ML method to generate regular expressions, wherein the regular expressions comprise patterns for how the entities and the relations are expressed in the data file, and the regular expressions are constrained by the predefined ontology or the predefined schema;
generate other entities and other relations by parsing another data file using the regular expressions generated from the data file, the parsed another data comprising the other entities and the other relations; and
calculate a score based on comparing statistics of the other entities and/or the other relations to baseline statistics for the entities and/or the relations;
compare the score to a predefined threshold; and
determine that one or more criteria are met when the score exceeds the predefined threshold thereby indicating that the regular expressions are not effective for parsing the another data file; and
in response to the regular expressions generated from the data file being determined to not be effective for parsing the another data file, update the regular expressions with additional entities and additional relations that are constraint entities categories of the predefined ontology or the predefined schema.

* * * * *